United States Patent
Ebina et al.

(10) Patent No.: US 9,738,179 B2
(45) Date of Patent: Aug. 22, 2017

(54) VEHICLE DRIVING SUPPORT DEVICE AND VEHICLE DRIVING SUPPORT METHOD

(71) Applicant: NISSAN MOTOR CO., LTD., Yokohama-shi, Kanagawa (JP)

(72) Inventors: Akihiko Ebina, Kanagawa (JP); Haruhiko Satou, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 14/906,358

(22) PCT Filed: May 27, 2014

(86) PCT No.: PCT/JP2014/002793
§ 371 (c)(1),
(2) Date: Jan. 20, 2016

(87) PCT Pub. No.: WO2015/011866
PCT Pub. Date: Jan. 29, 2015

(65) Prior Publication Data
US 2016/0159251 A1 Jun. 9, 2016

(30) Foreign Application Priority Data
Jul. 23, 2013 (JP) ................................. 2013-152548

(51) Int. Cl.
*B60N 2/02* (2006.01)
*B60N 2/00* (2006.01)
(Continued)

(52) U.S. Cl.
CPC ........... *B60N 2/0248* (2013.01); *B60N 2/002* (2013.01); *B60N 2/02* (2013.01); *B60N 2/0244* (2013.01);
(Continued)

(58) Field of Classification Search
CPC ...... B60N 2/0244; B60N 2/22; B60N 2/0248; B60N 2/002; B60N 2/02; B60W 50/082; B62D 1/183
(Continued)

(56) References Cited

U.S. PATENT DOCUMENTS 4,698,571 A * 10/1987 Mizuta ................. B60N 2/0228
 318/103
5,245,422 A 9/1993 Borcherts et al.
(Continued)

FOREIGN PATENT DOCUMENTS

JP 59200315 11/1984
JP 62128840 A 6/1987
(Continued)

*Primary Examiner* — Atul Trivedi
(74) *Attorney, Agent, or Firm* — Young Basile Hanlon & MacFarlane, P.C.

(57) ABSTRACT

A vehicle travel controller carries out automatic travel control of controlling a vehicle to travel automatically based upon travel state information of the vehicle and information on an exterior of the vehicle. An automatic/manual traveling changeover switch is capable of switching between an automatic driving mode in which the automatic travel control is carried out by the vehicle travel controller and a manual driving mode in which the driver drives the vehicle manually. A driving posture controller controls a reclining motor so that the reclining angle of the driver's seat in the automatic driving mode is larger than the reclining angle of the driver's seat in the manual driving mode.

8 Claims, 8 Drawing Sheets

(51) Int. Cl.
  *B62D 1/183* (2006.01)
  *B60N 2/22* (2006.01)
  *B60W 50/08* (2012.01)

(52) U.S. Cl.
  CPC .............. *B60N 2/22* (2013.01); *B60W 50/082* (2013.01); *B62D 1/183* (2013.01)

(58) Field of Classification Search
  USPC .......................................................... 701/49
  See application file for complete search history.

(56) References Cited

U.S. PATENT DOCUMENTS

| | | | |
|---|---|---|---|
| 5,774,069 A | 6/1998 | Tanaka et al. | |
| 6,782,316 B2* | 8/2004 | Breed .................... | B60N 2/002 180/273 |
| 7,594,699 B2* | 9/2009 | Satta .................... | B60N 2/0244 297/361.1 |
| 8,260,506 B2* | 9/2012 | Jungert .................. | B60N 2/002 701/49 |
| 9,174,552 B2* | 11/2015 | Ikeda ................. | B60H 1/00742 |
| 2001/0003806 A1* | 6/2001 | Swan .................... | B60N 2/002 701/49 |
| 2007/0265738 A1* | 11/2007 | Saito .................... | B60N 2/0248 701/2 |
| 2009/0088930 A1* | 4/2009 | Ohtsubo .............. | B60N 2/0252 701/49 |
| 2009/0284059 A1* | 11/2009 | Gupta .................. | B60N 2/0224 297/284.9 |
| 2010/0276973 A1* | 11/2010 | Zenk .................... | B60N 2/4415 297/284.3 |
| 2011/0285186 A1* | 11/2011 | Demmelmeier ..... | B60N 2/0248 297/217.1 |
| 2013/0218420 A1* | 8/2013 | Jendritza ................ | B60N 2/002 701/49 |
| 2013/0218487 A1* | 8/2013 | Fujii ................... | B60R 21/0152 702/41 |
| 2013/0275006 A1* | 10/2013 | Ystueta ................ | B60N 2/0244 701/49 |
| 2014/0246892 A1* | 9/2014 | Samain ..................... | B60N 2/66 297/463.1 |
| 2014/0265479 A1* | 9/2014 | Bennett .................. | B60N 2/502 297/217.4 |
| 2014/0309892 A1* | 10/2014 | Ricci ..................... | H04W 48/04 701/49 |
| 2015/0197205 A1* | 7/2015 | Xiong .................. | B60R 16/037 701/49 |
| 2015/0224877 A1* | 8/2015 | Bendewald ............ | B60K 37/06 701/49 |
| 2015/0232065 A1* | 8/2015 | Ricci ...................... | B60R 25/01 701/36 |
| 2016/0082867 A1* | 3/2016 | Sugioka ................ | B60N 2/442 701/49 |
| 2016/0101710 A1* | 4/2016 | Bonk ................... | B60N 2/0252 297/217.2 |
| 2016/0114703 A1* | 4/2016 | Fujita .................. | B60N 2/0232 297/344.1 |
| 2016/0264021 A1* | 9/2016 | Gillett ...................... | B60K 1/04 |
| 2016/0280097 A1* | 9/2016 | Hotary ................. | B60N 2/0244 |
| 2016/0318442 A1* | 11/2016 | James ...................... | B60Q 9/00 |
| 2016/0332586 A1* | 11/2016 | Hong ...................... | B60N 2/02 |
| 2016/0354027 A1* | 12/2016 | Benson .................. | A61M 21/02 |
| 2017/0097243 A1* | 4/2017 | Ricci ..................... | G01C 21/3617 |

FOREIGN PATENT DOCUMENTS

| | | |
|---|---|---|
| JP | 664548 A | 3/1994 |
| JP | H09-161196 A | 6/1997 |
| JP | 2002056489 A | 2/2002 |
| JP | 2003212071 A | 7/2003 |
| JP | 2005335627 A | 12/2005 |
| JP | 2007-038704 | 2/2007 |

* cited by examiner

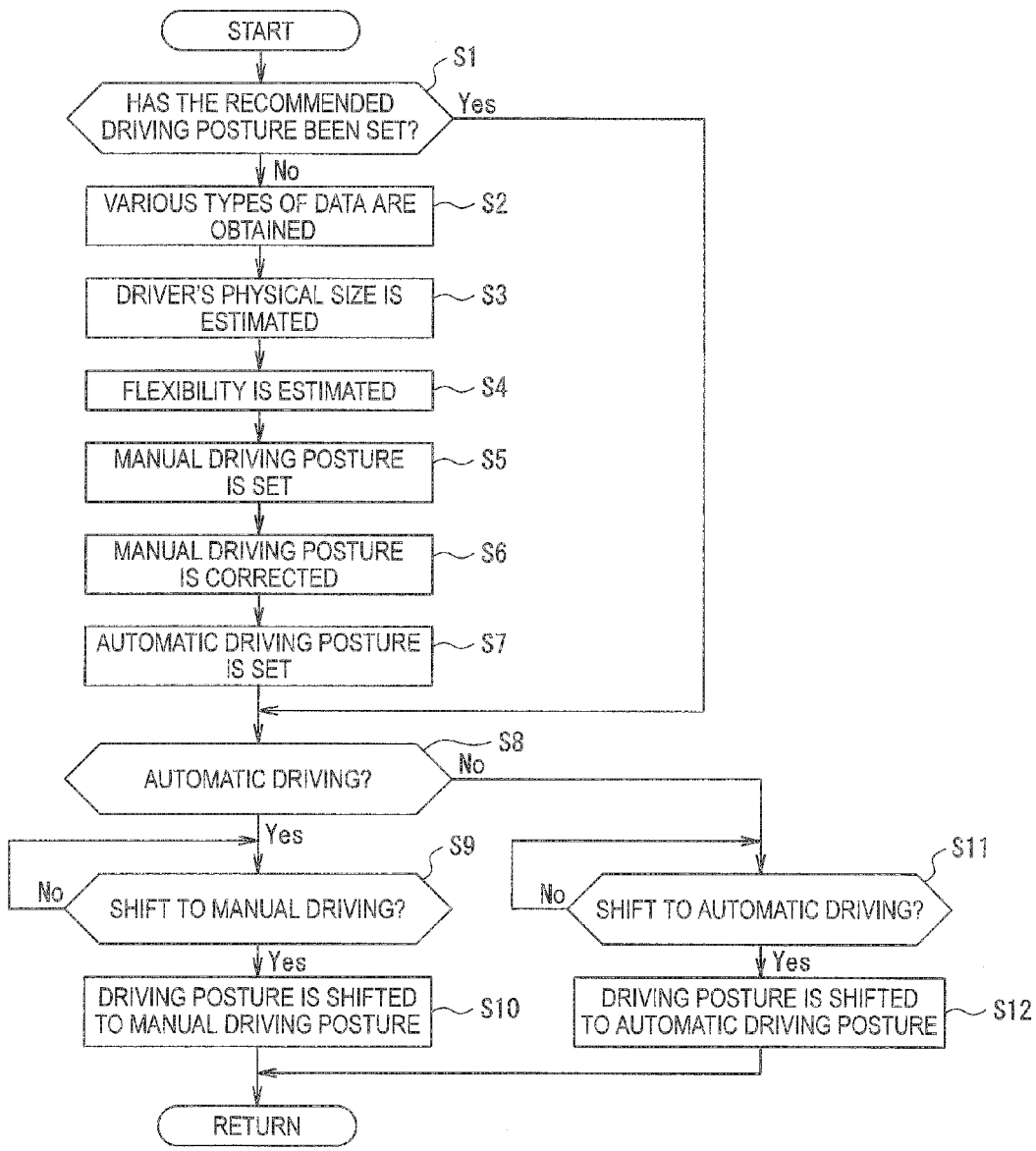

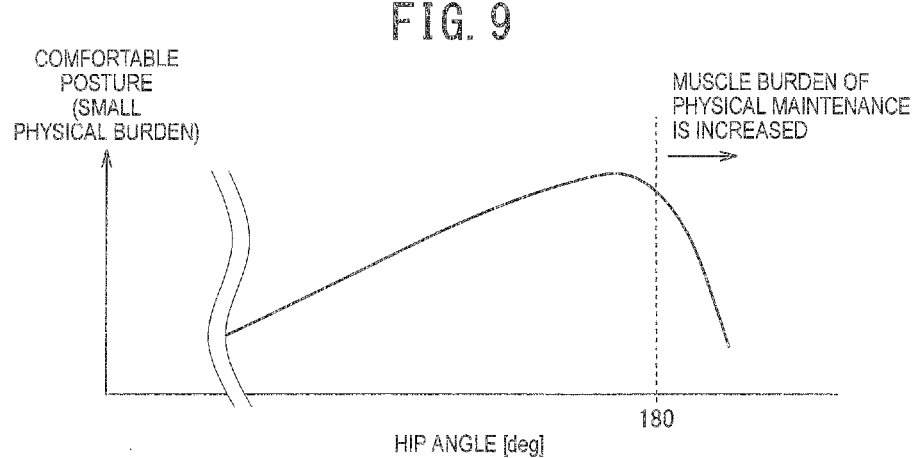
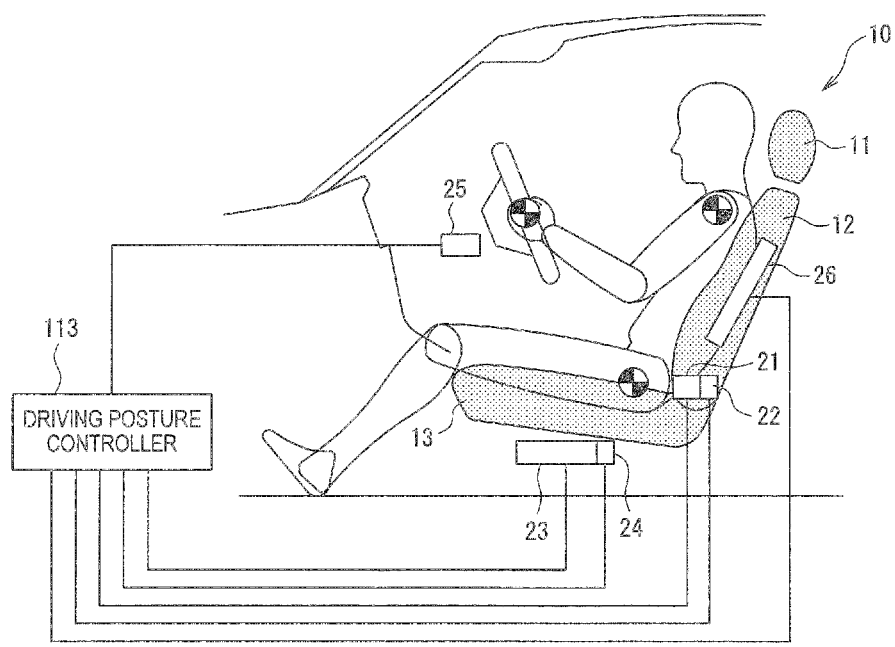

VEHICLE DRIVING SUPPORT DEVICE AND VEHICLE DRIVING SUPPORT METHOD

CROSS REFERENCE TO RELATED APPLICATION(S)

This application claims priority to Japanese Patent Application No. 2013-152548 (filed on Jul. 23, 2013), herein incorporated by reference.

TECHNICAL FIELD

The present invention relates to a vehicle driving support device and a vehicle driving support method, in which an automatic driving mode and a manual driving mode are switchable.

BACKGROUND

Conventionally, for example, one technology of controlling a vehicle speed or a steering angle based on information from various sensors for autonomous travel includes the technology described in JP H09-161196 A. In this technology, when an automatic driving mode in which a vehicle travels autonomously and a manual driving mode in which the driver manually drives the vehicle are switched, the switching of the driving mode is alarmed to the driver by an alarm display, sound, sheet vibration, or the like.

In the technology as described in JP H09-161196 A, however, the switching of the driving mode is alarmed to the driver by the alarm display, sound, sheet vibration, or the like. Hence, it is difficult for the driver to understand what the alarm intends to notify.

Thus, the present invention has an object to provide a vehicle driving support device and vehicle driving support method, by which it is easy for the driver to understand the switching of the driving mode.

SUMMARY

In order to solve the above problem, according to one aspect of the present invention, it is configured to be switchable between an automatic driving mode of carrying out automatic travel control of automatically operating a turning mechanism independent of a steering operation of a driver and a manual driving mode of operating the turning mechanism depending on the steering operation of the driver.

Then, a reclining angle of the driver's seat in the automatic driving mode is set to be larger than the reclining angle of the driver's seat in the manual driving mode, when the driving mode is switched between the automatic driving mode and the manual driving mode.

According to another aspect of the present invention, the reclining angle of the driver's seat is changed depending on whether the driving mode is the automatic driving mode or the manual driving mode. In this situation, since the reclining angle of the driver's seat in the automatic driving mode is larger than the reclining angle of the driver's seat in the manual driving mode, it is possible for the driver to understand the switching of the driving mode with ease.

BRIEF DESCRIPTION OF THE DRAWINGS

FIG. 4 is a flow chart illustrative of a driving posture control process procedure.

FIG. 9 is a view illustrative of a relationship between a hip angle and a comfortable posture.

FIG. 10 is a view illustrative of another example of the vehicle driving support device.

DETAILED DESCRIPTION OF THE EMBODIMENTS

Hereinafter, embodiments of the present invention will be described with reference to the attached drawings.
(First Embodiment)
(Configuration)

Figure 1:
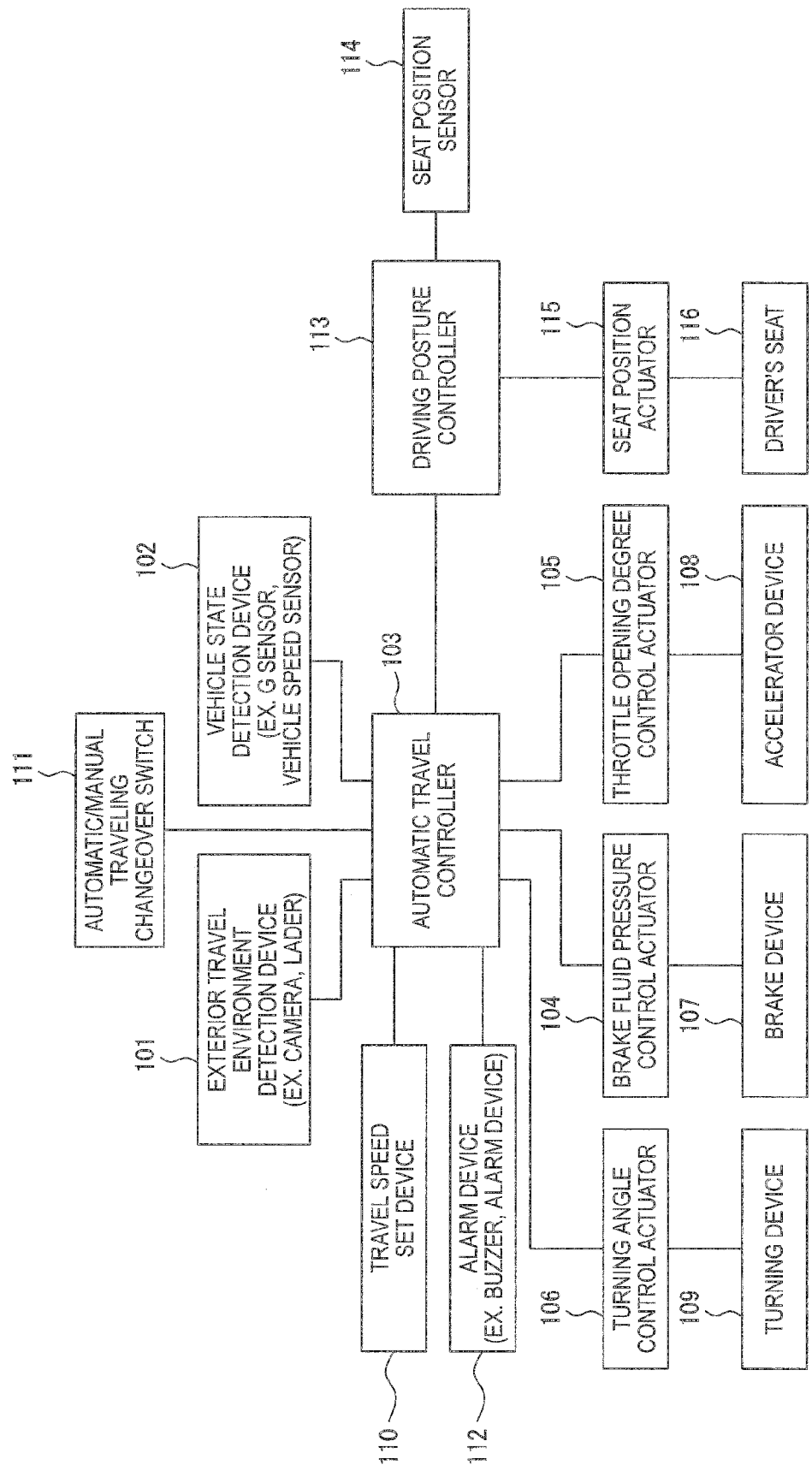
FIG. 1 is a view illustrative of functions of a vehicle having a vehicle driving support device in one embodiment of the present invention.

FIG. 1 is a view illustrative of functions of a vehicle having a vehicle driving support device in the present embodiment.

In the drawing, reference numeral 101 is an exterior travel environment detection device, and reference numeral 102 is a vehicle state detection device. The exterior travel environment detection device 101 includes for example, a camera, a laser radar, a GPS sensor, and the like, and is configured to recognize exterior situations of the travelling vehicle such as a distance from the travelling vehicle to a front vehicle, a vehicle travelling location, and the like. Information on the exterior situations that has been recognized by the exterior travel environment detection device 101 is input into an automatic travel controller 103.

In addition, the vehicle state detection device 102 includes a G sensor or a vehicle speed sensor, for example, and is configured to detect current travelling state information of the vehicle. The information detected by the vehicle state detection device 102 is also input into the automatic travel controller 103.

The automatic travel controller 103 is configured with a microcomputer including a CPU, a memory, and the like, for example.

The automatic travel controller 103 is configured to determine interior and exterior situations of the vehicle based on the information received from the exterior travel environment detection device 101 and the vehicle state detection device 102, and then to carry out automatic travel control of controlling the steering angle or the vehicle speed so that the vehicle travels automatically depending on a determination result.

To be specific, the automatic travel controller 103 is configured to acquire a situation of a travel lane, the vehicle location, the vehicle speed, and the like together with information on a route or a traffic condition to a destination place, a route condition such as a traffic regulation, or travel environments including other vehicles, a presence or absence of an obstacle, and the like, from the exterior travel environment detection device 101 and the vehicle state detection device 102. Then, the automatic travel controller 103 is configured to calculate a traveling path based on the above pieces of information, and to set the steering angle or the vehicle speed to travel on the traveling path. When there is a front vehicle ahead the vehicle, the automatic travel controller 103 is configured to carry out the automatic travel control for keeping a distance to the front vehicle constant depending on the vehicle speed, within a range that does not exceed a predefined speed set by the driver at a travel speed set device 110. On the other hand, when there is no front vehicle, the automatic travel controller 103 is configured to carry out the automatic travel control for keeping the speed set at the travel speed set device 110.

In addition, the automatic travel controller 103 is configured to output a brake control instruction for the automatic travel control to a brake fluid pressure control actuator 104 or an accelerator control instruction for the automatic travel control to a throttle opening degree control actuator 105. Further, the automatic travel controller 103 is configured to output a turning control instruction for the automatic travel control to a turning angle control actuator 106.

The brake fluid pressure control actuator 104 controls a brake system 107, whereas the throttle opening degree control actuator 105 controls an accelerator device 108. Furthermore, the steering angle control actuator 106 controls a turning device 109. Thus, by operating an accelerator, a brake, or a steering wheel automatically, the vehicle is made to travel autonomously without a driver's driving operation.

In addition, an automatic/manual travelling changeover switch 111 is a switch that can be operated by a driver, and the automatic driving mode in which the automatic travel control is carried out and the manual driving mode in which the driver manually drives the vehicle are appropriately switchable.

The above automatic travel control is in a condition where the driver operates the automatic/manual travelling changeover switch 111 to indicate the automatic driving mode, and is carried out only when the automatic travel controller 103 determines that the automatic travel control is possible from various pieces of information. Herein, the situation in which the automatic travel control is impossible includes a change of the destination place or the traveling path by the driver's circumstances, a sudden interruption of another vehicle, a sudden change of the weather, or the like.

In addition, in the present embodiment, for example, the automatic travel control is carried out on a highway, and the manual driving by the driver is carried out on a public road.

Further, the automatic travel controller 103 is configured to alarm the driver and passengers from a notification device 112 such as a buzzer or an alarm device, in an emergency or when a notification is necessary.

In addition, the controlled state by the automatic travel controller 103 is input into a driving posture controller 113 from the automatic travel controller 103. The driving posture controller 113 is configured with, for example, a microcomputer including a CPU, a memory, and the like. The driving posture controller 113 and the automatic travel controller 103 can be commonly realized on an identical computer.

The driving posture controller 113 receives inputs of a reclining angle of a seat back of a particular seat detected by a seat position sensor 114, and a slide amount in a front-rear direction of a seat bottom face of the particular seat. Herein, the particular seat corresponds to a driver's seat in the manual driving mode (hereinafter, simply referred to as driver's seat).

Then, upon detection of the switching between the automatic driving and the manual driving, the driving posture controller 113 controls positions of various parts of the driver's seat to carry out driving posture control of controlling a driver's driving posture to a posture depending on the driving mode (hereinafter, referred to as recommended driving posture). To be specific, the driving posture controller 113 is configured to output a control instruction for adjusting the reclining angle of the seat back of the driver's seat and the slide amount of the seat bottom face of the driver's seat in the front-rear direction of the vehicle to a seat position actuator 115. The seat position actuator 115 is configured to control each part of a driver's seat 116.

Figure 2:
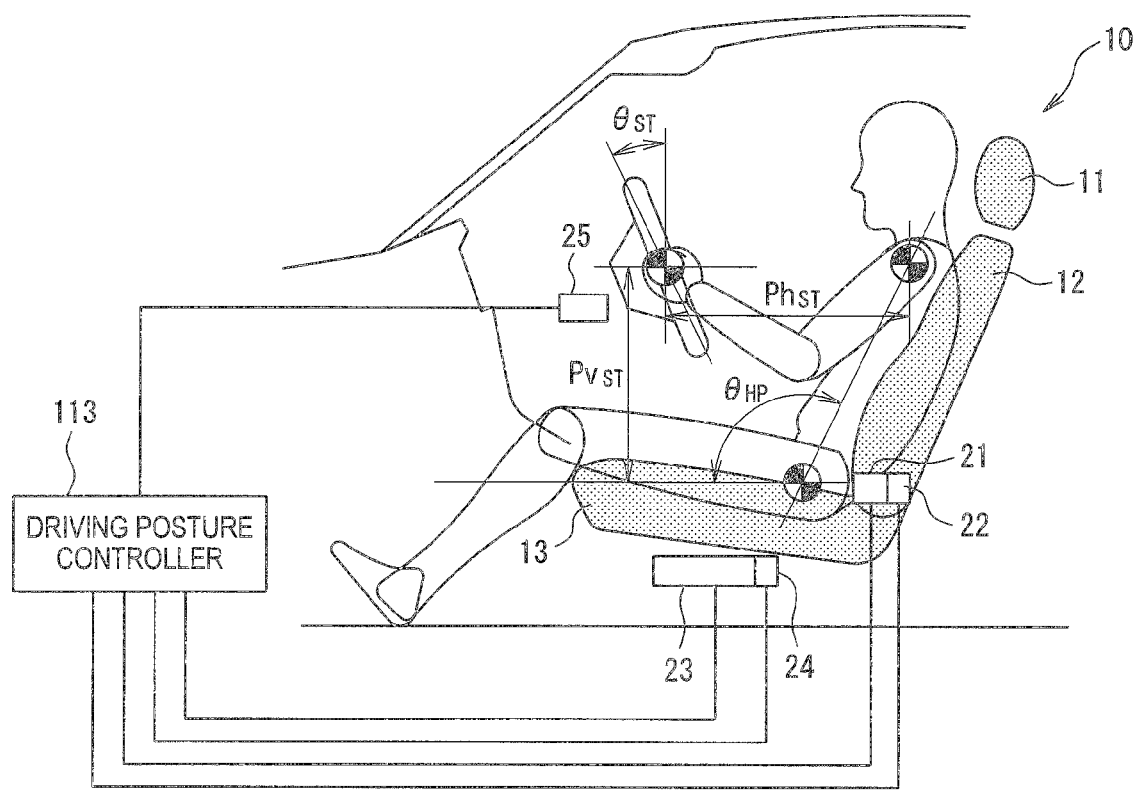
FIG. 2 is a side view illustrative of a driver's seat of the vehicle.

FIG. 2 is a side view illustrative of the driver's seat of the vehicle.

As illustrated in this FIG. 2, a driver's seat 10 includes a headrest 11, a seat back 12, and a seat bottom 13, which are included in the driver's seat 116 of FIG. 1. The seat back 12 is capable of tilting by a reclining motor 21, and a reclining sensor 22 is configured to detect a tilt angle of the seat back 12. In addition, the seat bottom 13 is slidable in the front-rear direction of the vehicle by the slide motor 23, and the slide sensor 24 detects a slide amount of the seat bottom 13.

Here, the seat position actuator 115 of FIG. 1 is configured with the reclining motor 21 and the slide motor 23. In addition, the seat position sensor 114 of FIG. 1 is configured with the reclining sensor 22 and the slide sensor 24.

Further, the steering actuator 25 is capable of adjusting the tilt angle of the steering wheel and a telescopic position, respectively.

The driving posture controller 113 is configured to adjust a hip angle $\theta_{HP}$, which is an angle made by axes of a driver's femoral region and body, by driving and controlling the reclining motor 21. In addition, the driving posture controller 113 is configured to adjust steering positions (a steering front-rear position $Ph_{ST}$, a steering top-bottom position $Pv_{ST}$, and a steering angle $\theta_{ST}$) by driving and controlling the slide motor 23 and the steering actuator 25.

Figure 3A:
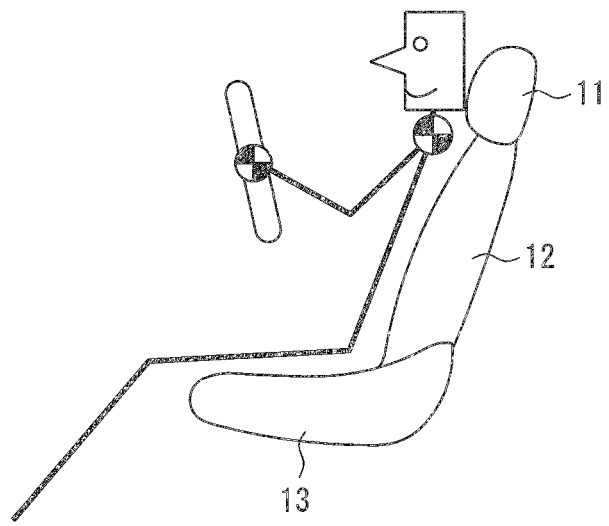
FIG. 3A and FIG. 3B are views illustrative of driving postures in an automatic driving mode and a manual driving mode.

To be specific, the driving posture controller 113 is configured to set a condition where the seat back 12 rises so that driver's hands can reach the steering wheel, in the manual driving mode in which the automatic travel control with the automatic travel controller 103 is not being carried out, as illustrated in FIG. 3A. In other words, the driver should take the posture for driving the vehicle. The posture illustrated in FIG. 3A is assumed to be a driving posture (recommended manual driving posture) appropriate for the manual driving mode.

Figure 3B:
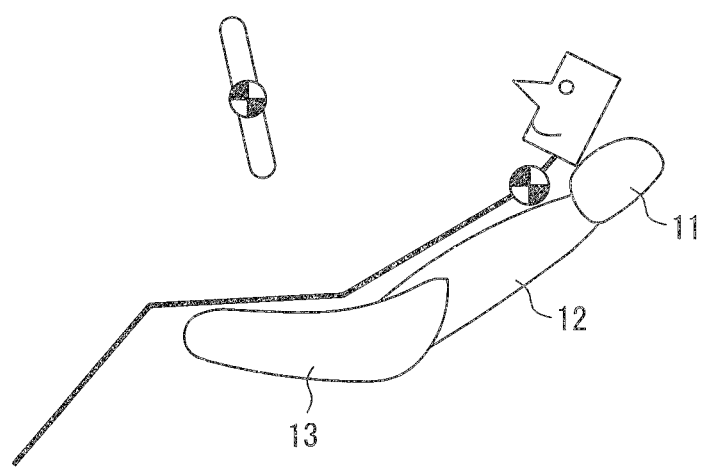

On the other hand, the driving posture controller 113 is configured to make the seat back 12 closer to be horizontal, in the automatic driving mode in which the automatic travel control with the automatic travel controller 103 is being carried out, as illustrated in FIG. 3B. In other words, the driver should take the posture for entrusting the driving of the vehicle to the automatic travel control (the automatic travel controller 103). Such a posture illustrated in FIG. 3B is assumed to be a driving posture (recommended automatic driving posture) appropriate for the automatic driving mode.

FIG. 4 is a flow chart illustrative of a driving posture control process procedure to be carried out by the driving posture controller 113. When the engine starts, the driving posture control process starts its operation and is carried out repeatedly at every predefined sampling time.

At first, in step S1, the driving posture controller 113 determines whether or not the recommended driving posture appropriate for each driving mode has been set. Then, when the recommended driving posture is not set, processing goes to step S2, whereas when the recommended driving posture has been set, processing goes to step S8 to be described below.

In step S2, the driving posture controller 113 acquires various types of data necessary for setting the recommended driving posture, and processing goes to step S3. In the present embodiment, the recommended driving posture is set depending on a driver's body size or a driver's personal physical feature (hereinafter, simply referred to as physical feature). In addition, as the physical feature, information representing a physical flexibility of the driver's body is used. Thus, in step S2, for example, the slide amount of the seat and an opening degree of the door of the driver's seat, a driver's leg position, and the like, when the driver gets in the vehicle, are acquired.

In step S3, the driving posture controller 113 estimates the driver's body size. At first, a driver's leg length is estimated by using a physical size model that has been stored beforehand, based on the slide amount of the seat when the driver gets in the vehicle. Next, a driver's arm length from shoulder to hand and the driver's height are estimated from the estimated driver's leg length, by using the physical size model.

In step S4, the driving posture controller 113 estimates the driver's flexibility. The flexibility represents the softness of the driver's body. When the flexibility is low, the driver tends to be bad at twisting of the upper part of the body, the raising movement of the shoulder, and the like. Herein, the flexibility is estimated based on, for example, the driver's height estimated in step S3, the opening degree of the door of the driver's seat, and the driver's leg position when the driver gets in the vehicle. In the present embodiment, the driver's flexibility is categorized into three standards "low", "medium", and "high".

Figure 5:
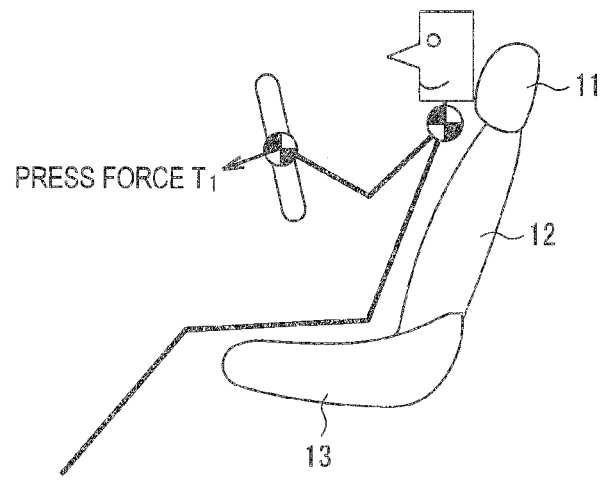
FIG. 5 is a view illustrative of a recommended manual driving posture.

In step S5, the driving posture controller 113 sets the manual driving posture that is the driving posture in the manual driving mode. Here, the manual driving posture is, as illustrated in FIG. 5, a driving posture of applying a certain steering press force $T_1$ to a steering wheel from the driver's hands.

Figure 6A:
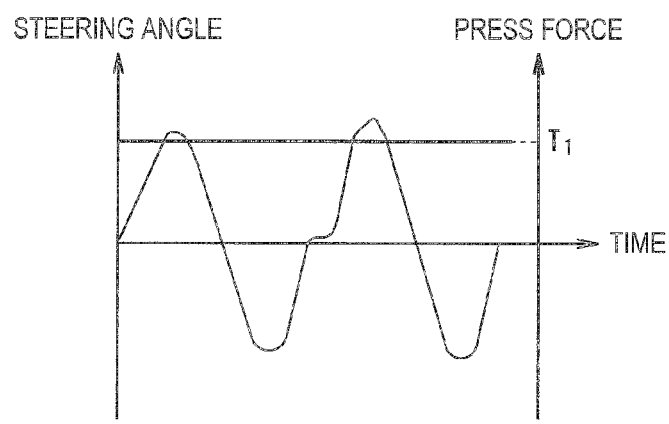
FIG. 6A and FIG. 6B are views illustrative of relationships between a steering stability and a steering press force.
Figure 6B:
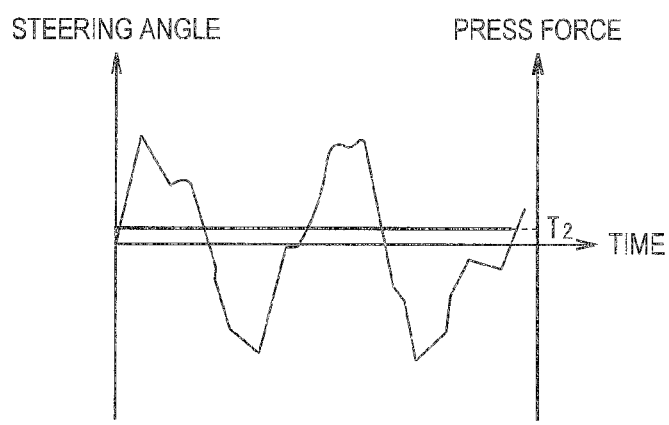

FIG. 6A and FIG. 6B are views illustrative of differences in the steering press force between a skilled driver and an unskilled driver. Here, FIG. 6A illustrates the steering operation of the skilled driver, and FIG. 6B illustrates the steering operation of the unskilled driver.

As illustrated in FIG. 6A, in a case of the skilled driver, the steering press force is comparatively large (press force $T_1$), and a steering curved line is smooth like a sine wave, and it is understood that the steering operation is stable. On the other hand, as illustrated in FIG. 6B, in a case of the unskilled driver, the steering press force is comparatively small (press force $T_2 < T_1$), and the steering operation is unstable with many steering adjustments.

Thus, in the present embodiment, in order to realize the stable steering in the manual driving mode, the manual driving posture is set as the driving posture in which the average steering press force $T_1$ of the skilled driver is added to the steering wheel from the driver's hands. The settings of the driving posture are accomplished by setting posture conditions of the hip angle $\theta_{HP}$, the steering front-rear position $Ph_{ST}$, the steering top-bottom position $Pv_{ST}$, and the steering angle $\theta_{ST}$.

These posture conditions ($\theta_{HP}$, $Ph_{ST}$, $Pv_{ST}$, and $\theta_{ST}$) for setting the manual driving posture are stored beforehand for every body size. Then, based on the driver's body size estimated in step S3, the posture conditions for setting the manual driving posture appropriate for the driver's body size are acquired. It is to be noted that to simplify the setting process, the body size may be categorized into three standards of "low", "medium", and "high" to set the posture conditions.

In step S6, the driving posture controller 113 corrects the manual driving posture set in step S5 with the driver's flexibility estimated in step S4.

Figure 7:
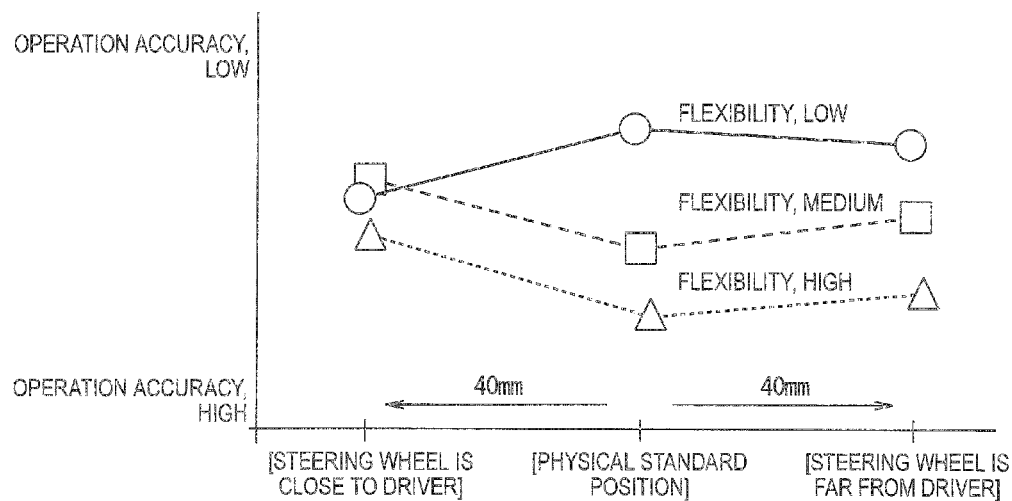
FIG. 7 is a view illustrative of relationships between physical features and operation accuracy.

As FIG. 7 illustrates a relationship between the flexibilities and the operation accuracy, when the flexibility is low and the driver's driving posture is positioned closer to the steering wheel than the physical standard position, it is known that the operation accuracy is higher. In addition, in the position where the driver's driving posture is farther away from the steering wheel than the physical standard position, the operation accuracy is almost same with that in the physical standard position.

In contrast, when the flexibility is general or high, the operation accuracy is high in both cases where the driver's driving posture is positioned at the physical standard position and where the driver's driving posture is positioned farther away from the steering wheel than the physical standard position. In addition, in the case where the driver's driving posture is closer to the steering than the physical standard position, the operation accuracy is lower. However, the operation accuracy in this case is almost same with that of the case where the flexibility is low and the driver's driving posture is closer to the steering wheel than the physical standard position.

Thus, the operation accuracy is different depending on the feature of each individual. Thus, in the present embodiment, in consideration of the flexibility that is a feature of an individual human body, the manual driving posture is corrected to improve the operation accuracy more.

To be specific, in a case where the driver's flexibility is "medium" or "high", the manual driving posture set in step S5 is set to the recommended driving posture in the manual driving mode without a change. On the other hand, in a case where the driver's flexibility is "low", the steering front-rear position $Ph_{ST}$ of the manual driving posture set in step S5 is corrected to be closer to the steering wheel, and is set to the recommended driving posture in the manual driving mode. Here, the correction amount of the steering front-rear position $Ph_{ST}$ is set to equal to or shorter than 40 mm, in which the driver can operate the steering wheel without degrading the operation accuracy.

Figure 8:
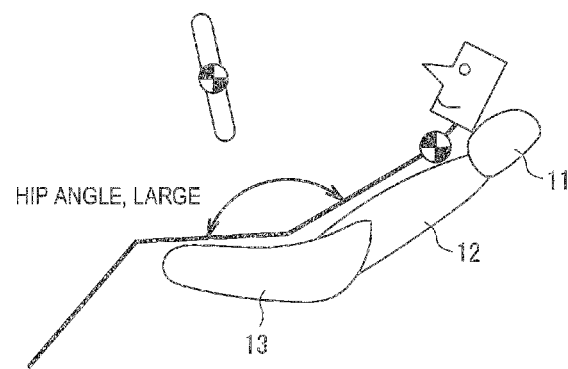
FIG. 8 is a view illustrative of a recommended automatic driving posture.

In step S7, the driving posture controller 113 sets the recommended driving posture in the automatic driving mode. Here, the automatic driving posture is set to the driving posture such that the hip angle $\theta_{HP}$ is an obtuse angle, as illustrated in FIG. 8. In the automatic driving mode, the driver does not have to take the driving posture. Therefore, the automatic driving posture is set by placing an importance on a comfortable posture (small physical burden).

As illustrated in FIG. 9, it is understood that the comfortable posture has a high correlation with the hip angle $\theta_{HP}$. The pressure amount of the driver's belly is smaller, as the hip angle $\theta_{HP}$ is larger. However, if there is a part where a muscle load for maintaining the body is increased or the head position is lower than the horizontal line, the muscle load and blood stream will be adversely affected and the load will be applied to the body. Therefore, there is a limit in the size of the hip angle $°_{HP}$ that allows the driver to take a comfortable posture.

In the present embodiment, in consideration of the belly pressure amount and the muscle burden of the physical maintenance, it is determined that the posture in which the hip angle $\theta_{HP}$ is slightly smaller than 180 degrees is the posture in which the driver's physical burden amount is the minimum. Then, this posture is set as the automatic driving posture.

In step S8, the driving posture controller 113 determines whether or not the automatic travel control is being carried out at the automatic travel controller 103. In other words, the driving posture controller 113 determines whether or not the driving mode is the automatic driving mode. Then, in the automatic driving mode, processing goes to step S9, and in the manual driving mode, processing goes to step S11 to be described below.

In step S9, the driving posture controller 113 determines whether or not it is the timing when the automatic driving mode should be shifted to the manual driving mode. For example, when the vehicle enters a public road from a highway, or when it is determined that the automatic travel control cannot be continued by a sudden change in the travel environment or the like, the driving posture controller 113 determines that it is the timing when the automatic driving mode should be shifted to the manual driving mode. Then, when the automatic driving mode continues, just stand by without a change, or when the driving posture controller 113 determines that the driving mode should be shifted to the manual driving mode, processing goes to step S10.

In step S10, the driving posture controller 113 drives and controls a reclining motor 21, a slide motor 23, and a steering actuator 25, while determining the driving posture based on detection signals of the reclining sensor 22 and the slide sensor 24. In this manner, the driving posture is switched to the recommended manual driving posture set in step S6.

In step S11, the driving posture controller 113 determines whether or not it is the timing when the manual driving mode should be shifted to the automatic driving mode. For example, when the driver operates the automatic/manual travelling changeover switch 111 to make a state indicative of the automatic driving mode, the driving posture controller 113 determines that it is the timing when the manual driving mode should be shifted to the automatic driving mode. Then, when the manual driving mode continues, just stand by without a change, and when the driving posture controller 113 determines that the driving mode should be shifted to the automatic driving mode, processing goes to step S12.

In step S12, the driving posture controller 113 drives and controls the reclining motor 21, the slide motor 23, and the steering actuator 25, while determining the driving posture based on detection signals of the reclining sensor 22 and the slide sensor 24. In this manner, the driving posture is switched to the recommended automatic driving posture set in step S7.

(Operation)

An operation of the present embodiment will be described below.

When a driver sets the key at a starting position to start the engine, the driving posture controller 113 estimates the driver's body size such as a leg length, an arm length from shoulder to hand, or the like from the seat slide amount of the driver's seat when the driver gets in the vehicle (step S3 of FIG. 4). In addition, the driver's physical feature (flexibility) is estimated from the door opening degree when the driver gets in the vehicle (step S4). Then, the recommended driving posture appropriate for the manual driving mode and the recommended driving posture appropriate for the automatic driving mode are set based on the body size and the physical feature that have been estimated.

When the body size is comparatively large and the flexibility is low, the driver tends to open a vehicle door comparatively largely to get in the vehicle. In addition, the slide amount of the driver's seat when the driver gets in the vehicle is comparatively large. Thus, the driver's body size and physical feature are estimated by using such a difference in action when the driver gets in the vehicle depending on the body size and the physical feature.

Then, in accordance with the estimated body size, the posture in which a steering press force is equal to or larger than a certain amount is set as a driving posture in the manual driving mode (step S5), and is then corrected with the physical feature by which the driving posture has been estimated (step S6).

As illustrated in FIG. 7, when the flexibility is low, even with the same body size, as the driver is closer to the steering wheel, the steering operation accuracy is higher, as compared to a case of standard flexibility. Thus, when the driver's flexibility is low, the manual driving posture that has been set depending on the body size is corrected so that the steering front-rear position $Ph_{ST}$ is smaller, and is set as the recommended manual driving posture.

For example, in a case where the setting has been made such that the driver is driving the vehicle on a highway in the automatic driving mode and then enters an interchange by manually driving the vehicle, it is necessary to switch from the automatic driving mode to the manual driving mode just before entering the interchange. In other words, when the vehicle location reaches just before the interchange while travelling in the automatic driving mode, the driving posture controller 113 determines that the automatic driving mode should be shifted to the manual driving mode (step S9: Yes). Then, the driving posture controller 113 controls each part of driver's seat, and switches the driver's posture to the recommended manual driving posture that has been set based on the driver's body size and physical feature (step S10).

Accordingly, the driver's posture is changed to the posture familiar with the body as usual as a manual driving posture. Therefore, the driver is able to recognize easily that it is necessary to switch to the manual driving mode. Thus, the driver operates the automatic/manual traveling changeover switch 111 so that shifting to the manual driving can be accomplished naturally.

In addition, the recommended manual driving posture is set to the posture with the steering press force being equal to or larger than a certain amount in consideration of the driver's body size and physical feature. Therefore, in the manual driving mode, from the time point when the driver holds the steering wheel, the stable steering operation can be realized.

When the driver operates the automatic/manual traveling changeover switch 111 in driving the vehicle in the manual driving mode, the automatic travel controller 103 starts the automatic travel control. Then, the driving posture controller 113 determines that the manual driving mode should be shifted to the automatic driving mode (step S11: Yes). Then, the driving posture controller 113 controls each part of the driver's seat, and switches the driver's posture to the recommended automatic driving posture (step S12).

In other words, in steps S10 and S12, processing is carried out to make the reclining angle of the driver's seat in the automatic driving mode larger than the reclining angle of the driver's seat in the manual driving mode.

Accordingly, the driver's posture is the posture with a comparatively large hip angle. Thus, in the automatic driving mode, the driver is able to take a comfortable posture, and driver's fatigue in the travelling process is reduced. In addition, by being replaced with such a comfortable posture in this manner, the driver can understand the situation easily that the driver may entrust the driving to the vehicle in the automatic travel control.

In this situation, the recommended automatic driving posture is set in consideration of the belly pressure amount and the muscle burden of the body maintenance. The belly pressure amount is smaller, as the hip angle is larger, and the muscle burden of the body maintenance is gradually increased in a region where the hip angle is larger than a given value. As the recommended automatic driving posture is set in consideration of this, it is possible for the driver to take the posture where the driver's physical burden is the minimum in the automatic driving mode. Thus, the driver's fatigue in the travelling process in the automatic driving mode can be reduced effectively.

As described above, in the present embodiment, by changing a combination of the reclining angle of the driver's seat, the seat slide amount, and the steering position, respectively, the driver's posture is changed to the recommended driving posture in accordance with each driving mode that has been set in consideration of the driver's body size and physical feature. In this situation, in the manual driving mode, the posture is controlled to be the driving posture (high steering stability/high operation accuracy) that is good in the steering operability. In addition, in the automatic driving mode, the posture is controlled so that the driver's fatigue is small in the travelling process.

Thus, on an occasion of switching the driving mode, as the position of each part in the driver's seat is controlled to change the driver's posture, the driver is able to recognize the switching of the driving mode easily, as compared to a case where the switching of the driving mode is alarmed by a beep, sound, or seat vibration. In addition, since the driving posture in each driving mode is set based on the driver's body size and physical feature, the driving posture appropriate for each driving mode can be set.

It is to be noted that in FIG. 2, the reclining motor 21 corresponds to a reclining angle adjustment unit, the slide motor 23 corresponds to a front-rear position adjustment unit, and the steering actuator 25 corresponds to a steering adjustment unit.

Further, in FIG. 4, step S3 corresponds to a body size estimation unit, and step S4 corresponds to a physical feature estimation unit. In addition, step S5 corresponds to a manual driving posture setting unit, and step S6 corresponds to a manual driving posture correction unit. In addition, step S10 and S12 correspond to a reclining angle controller.

(Effectiveness)

In the present embodiment, the following effectiveness is obtainable.

(1) When detecting the switching from the manual driving mode to the automatic driving mode, the driving posture controller 113 increases the reclining angle of the driver's seat to the reclining angle in the automatic driving mode from the reclining angle in the manual driving mode. In addition, when detecting the switching from the automatic driving mode to the manual driving mode, the driving posture controller 113 decreases the reclining angle of the driver's seat to the reclining angle in the manual driving mode from the reclining angle in the automatic driving mode.

Thus, the driver's posture is changed by changing the reclining angle of the driver's seat depending on the driving mode. In this situation, since the reclining angle of the driver's seat in the automatic driving mode is larger than the reclining angle of the driver's seat in the manual driving mode, the driver is able to understand the switching of the driving mode easily.

(2) The driving posture controller 113 estimates the driver's body size. In addition, the driving posture controller 113 sets the posture in which the driver's press amount against the steering wheel is equal to or larger than a certain value that enables the stable steering operation that is determined by the estimated driver's body size, as the recommended driving posture appropriate for the manual driving mode.

Thus, when the driving mode is switched to the manual driving mode, the steering press amount is equal to larger than a certain amount from the time when the driver holds the steering wheel. Therefore, the driver is able to carry out the stable steering operation. In addition, since the recommended driving posture in the manual driving mode is the posture familiar with the driver's body as usual as the posture in the manual driving, it is possible to shift to the manual driving mode from the automatic driving mode naturally.

(3) The driving posture controller 113 estimates a driver's physical feature. Then, depending on the physical feature that has been estimated, the driving posture controller 113 corrects the recommended driving posture in the manual driving mode that has been set based on the body size.

Thus, in consideration of the difference in the steering posture in which the driver easily operates the steering wheel depending on the individual human body feature, the recommended driving posture in the manual driving mode is determined depending on the driver's physical feature. Thus, in the manual driving mode, it is possible for the driver to take the driving posture more appropriate for the driver.

(4) The driving posture controller 113 estimates the driver's physical flexibility as a driver's physical feature based on a driver's action at the time of getting in or out of the vehicle.

Even with the same body size, the driving posture that improves the steering operation accuracy is different depending on the difference in physical flexibility. For example, when the flexibility is standard or high, the steering accuracy is higher, as the steering wheel is closer to the driver than the physical standard position. On the other hand, when the flexibility is low, the operation accuracy is lower, as the steering wheel is closer to the driver than the physical standard position. In consideration of these facts, the recommended driving posture in the manual driving mode is determined, so that the driver can take the driving posture more appropriate for the driver and the stable steering operation can be achieved.

(5) The driving posture controller 113 changes the slide amount of the seat bottom in addition to the reclining angle. Then, when the driving posture controller 113 detects switching from the automatic driving mode to the manual driving mode, the driving posture controller 113 sets the position of the driver's seat bottom face in the front-rear direction of the vehicle so that the driver's driving posture is the recommended driving posture in the manual driving mode.

Thus, as the reclining angle and the slide amount of the driver's seat are configured to be changeable, the driver's hip angle and the distance from the driver's seat to the steering wheel in the front-rear direction of the vehicle can be adjusted. Thus, the driver's posture can be changed to the recommended driving posture appropriate for the driving mode appropriately.

(6) The driving posture controller 113 changes the steering position in addition to the reclining angle of the seat back. When the driving posture controller 113 detects switching from the automatic driving mode to the manual driving mode, the driving posture controller 113 sets the position of the steering wheel in the front-rear direction and in an up-down direction of the vehicle so that the driver's driving posture is the recommended driving posture in the manual driving mode.

Thus, since the reclining angle and the slide amount of the driver's seat and the steering position are configured to be changeable, the positional relationship of the driver's hip angle, the driver's seat, and the steering wheel can be adjusted appropriately. Thus, the posture control is enabled to the recommended driving posture appropriate for the driving mode with accuracy.

(7) When the driving posture controller 113 detects switching from the manual driving mode to the automatic driving mode, the reclining angle of the driver's seat is made larger to the reclining angle in the automatic driving mode from the reclining angle in the manual driving mode. In addition, when the driving posture controller 113 detects switching from the automatic driving mode to the manual driving mode, the reclining angle of the driver's seat is made smaller to the reclining angle in the manual driving mode from the reclining angle in the automatic driving mode.

Thus, the driver's posture is changed by changing the reclining angle of the driver's seat depending on the driving mode. As the driving posture is changed to be appropriate for the driving mode, it is possible for the driver to understand the switching of the driving mode easily.

(Applications)

In the above embodiment, instead of the configuration of FIG. 2, a contact pressure sensor 26 can be arranged in the seat back 12, as illustrated in FIG. 10. In such a configuration, the steering press force can be measured indirectly from a relationship of the action and reaction of the contact pressure sensor 26 of the seat back 12. Thus, it is possible to adjust the driving posture in the manual driving mode with certainty so that the steering press force is equal to or larger than a certain amount $T_1$.

Figure 11:
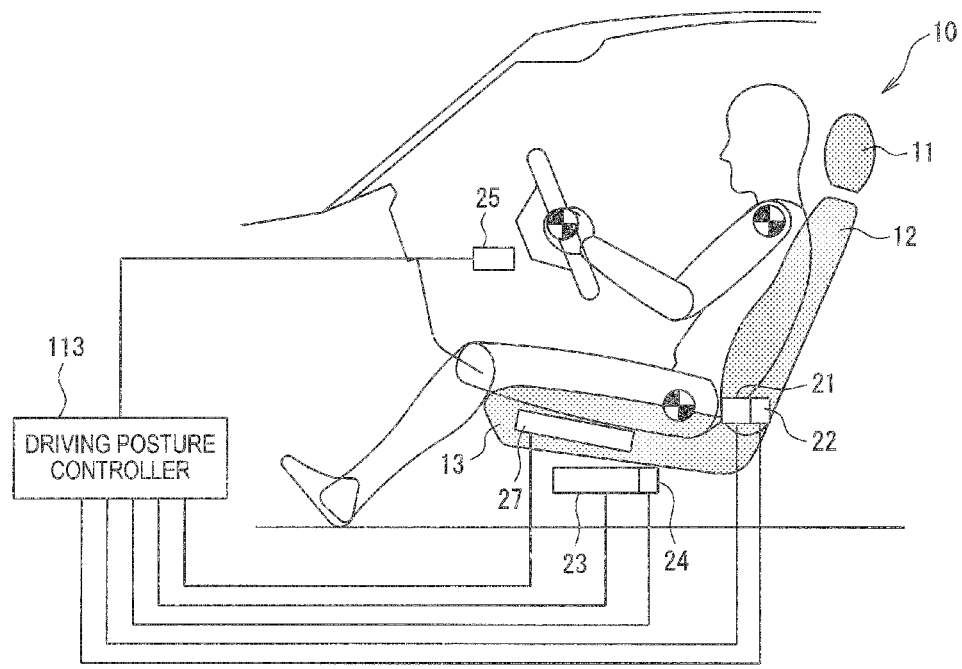
FIG. 11 is a view illustrative of yet another example of the vehicle driving support device.

(2) In the above embodiment, instead of the configuration of FIG. 2, a contact pressure sensor 27 can be arranged in the seat bottom face, as illustrated in FIG. 11. In such a configuration, when the driver is seated, it is possible to estimate the driver's weight. Thus, the estimation accuracy of the driver's physical size can be improved by using the driver's leg length that has been estimated based on the seat slide amount detected by the slide sensor 23 when the driver gets in the vehicle and the driver's weight that has been estimated based on a detection signal of the contact pressure sensor 27.

Figure 12:
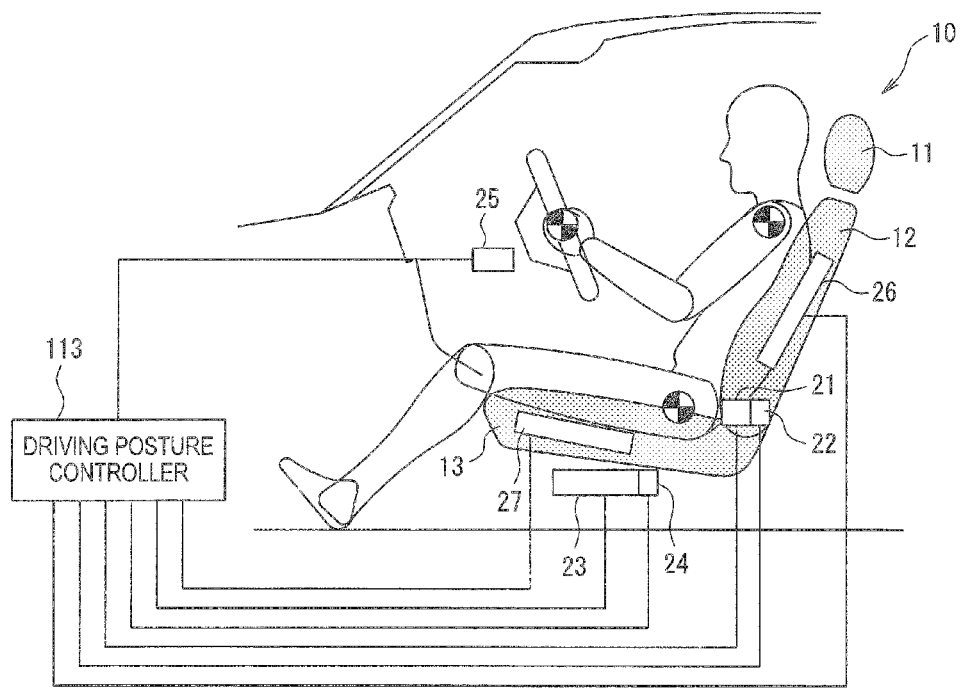
FIG. 12 is a view illustrative of further another example of the vehicle driving support device.

(3) In the above embodiment, instead of the configuration of FIG. 2, the contact pressure sensor 26 of FIG. 10 and the contact pressure sensor 27 of FIG. 11 can be included, as illustrated in FIG. 12. Accordingly, it is possible to estimate the driver's body size with accuracy and to enable the posture control with high accuracy in switching to the manual driving mode.

(Modifications)

In the above embodiment, the reliability degree of the automatic travel control by the automatic travel controller 103 is detected, so that the driving posture in the automatic driving mode can be adjusted depending on the reliability degree. Here, the reliability degree of the automatic travel control is a system confidence degree representing the certainty of the automatic travel control. The reliability degree is lower, as there is a higher possibility of malfunction in the automatic travel control. Then, while the vehicle is travelling in the automatic driving mode, the driving posture controller 113 makes the driver's driving posture closer to the recommended driving posture in the manual driving mode from the recommended driving posture in the automatic driving mode, as the reliability degree of the automatic travel control is lower.

In other words, the driving posture is configured to be adjustable in a stepwise manner between the recommended manual driving posture set in step S6 of FIG. 4 and the recommended automatic driving posture set in step S7. Then, adjustments are enabled such that as the reliability degree of the automatic travel control is higher, the driving posture is closer to the recommended automatic driving posture, whereas the reliability degree of the automatic travel control is lower, the driving posture is closer to the recommended manual driving posture.

Thus, as the posture is controlled in accordance with the system confidence degree of the vehicle in the automatic travel control, it is possible to shift from an automatic driving state to a manual driving state in a stepwise manner.

In addition, the reliability degree of the automatic travel control described above is detected by any one or a combination of the number of the sensing objects in the automatic travel control, the number of sensors necessary for sensing in the automatic travel control, complexity of the sensing object in the automatic travel control such as a movement forecast of a bicycle, the number of selections in the travel path, an operation amount needed for control object determination, and energy needed for the automatic travel control.

Thus, it is possible to understand the system confidence degree in relation to the sensing or recognition in the automatic travel control, through the driving posture easily.

(2) In the above embodiment, the description has been given of the case where the automatic travel control is carried out such that even a driver does not operate an operation element, and the vehicle is controlled to travel autonomously. The present invention, however, is applicable to a case where a turning mechanism is controlled to autonomously operate without the driver's operation of the operation element at least.

Herein, a limited number of embodiments have been described with reference to the drawings. The present invention, however, is not limited to them. It is apparent for a person skilled in the art that there are variations in the embodiment based upon the above disclosure.

The invention claimed is:

1. A vehicle driving support device, comprising:
a reclining angle adjustment unit capable of adjusting a reclining angle of a driver's seat; and
a reclining angle controller configured to change the reclining angle by controlling the reclining angle adjustment unit depending on a driving mode, the driving mode being switchable between an automatic driving mode in which the vehicle steers autonomously and a manual driving mode in which a driver manually steers the vehicle,
wherein the reclining angle controller is configured to change the reclining angle, when the driving mode is switched between the automatic driving mode and the manual driving mode, so that the reclining angle in the automatic driving mode is larger than the reclining angle in the manual driving mode.

2. The vehicle driving support device according to claim 1, further comprising:
- a body size estimation unit configured to estimate a driver's body size; and
- a manual driving posture setting unit configured to set a posture in which a driver's pressing force against a steering wheel is equal to or larger than a certain value that enables stable steering that is determined by the driver's body size estimated by the body size estimation unit, as a driving posture in accordance with the manual driving mode,
- wherein the reclining angle controller is configured to control the reclining angle adjustment unit so that the driving posture of the driver in the manual driving mode is the posture set by the manual driving posture setting unit.

3. The vehicle driving support device according to claim 2, further comprising:
- a physical feature estimation unit configured to estimate a personal physical feature of the driver; and
- a manual driving posture correction unit configured to correct the driving posture in accordance with the manual driving mode set by the manual driving posture setting unit with the personal physical feature estimated by the physical feature estimation unit.

4. The vehicle driving support device according to claim 3, wherein the physical feature estimation unit is configured to estimate a physical flexibility of the driver as the personal physical feature of the driver, based on an action of the driver when the driver gets in or out of a vehicle.

5. The vehicle driving support device according to claim 2, further comprising a front-rear position adjustment unit capable of adjusting a seat bottom face of the driver's seat in a front-rear direction of the vehicle,
- wherein the reclining angle controller is configured to control the front-rear position adjustment unit in addition to the reclining angle adjustment unit, and
- wherein the reclining angle controller, when detecting switching from the automatic driving mode to the manual driving mode, is configured to control the front-rear position adjustment unit so that a position of the seat bottom face of the driver's seat in the front-rear direction of the vehicle becomes a position in which the driving posture of the driver becomes the posture set by the manual driving posture setting unit.

6. The vehicle driving support device according to claim 2, further comprising a steering adjustment unit capable of adjusting a position of a steering wheel in a front-rear direction and a top-bottom direction of the vehicle,
- wherein the reclining angle controller is configured to control the steering adjustment unit in addition to the reclining angle adjustment unit, and
- wherein the reclining angle controller, when detecting switching from the manual driving mode to the automatic driving mode, is configured to control the steering adjustment unit so that the position of the steering wheel in the front-rear direction and the top-bottom direction of the vehicle becomes the position in which the driving posture of the driver is the posture set by the manual driving posture setting unit.

7. The vehicle driving support device according to claim 1,
- wherein in the automatic driving mode, an automatic travel control makes the vehicle travel automatically independent of a steering operation of the driver with a steering element,
- further comprising a reliability degree detection unit configured to detect a reliability degree of the automatic travel control, based upon at least one of a number of sensing objects in the automatic travel control, a number of sensors necessary for sensing in the automatic travel control, a complexity of a sensing object in the automatic travel control, and an operation amount in the automatic travel control,
- wherein the reclining angle controller is configured to control the reclining angle adjustment unit so that as the reliability degree detected by the reliability degree detection unit is lower in the automatic travel control, a driving posture of the driver is closer to a driving posture in accordance with the automatic driving mode from a driving posture in accordance with the manual driving mode.

8. A vehicle driving support method, comprising:
- switching between an automatic driving mode in which the vehicle steers autonomously and a manual driving mode in which a driver manually steers the vehicle; and
- changing a reclining angle of the driver's seat, when the driving mode is switched between the automatic driving mode and the manual driving mode, so that the reclining angle of the driver's seat in the automatic driving mode is larger than the reclining angle of the driver's seat in a manual driving mode.

* * * * *